(12) United States Patent
Fella

(10) Patent No.: US 10,638,805 B2
(45) Date of Patent: May 5, 2020

(54) UNITARY DRAWSTRING ACCESSORY

(71) Applicant: Stefan Fella, Rochester, NY (US)

(72) Inventor: Stefan Fella, Rochester, NY (US)

( * ) Notice: Subject to any disclaimer, the term of this patent is extended or adjusted under 35 U.S.C. 154(b) by 8 days.

(21) Appl. No.: 16/132,330

(22) Filed: Sep. 14, 2018

(65) Prior Publication Data

US 2020/0085118 A1    Mar. 19, 2020

(51) Int. Cl.
*A41D 27/08* (2006.01)
*B33Y 80/00* (2015.01)
*A41D 1/04* (2006.01)

(52) U.S. Cl.
CPC ............ *A41D 27/08* (2013.01); *A41D 27/085* (2013.01); *B33Y 80/00* (2014.12); *A41D 1/04* (2013.01); *A41D 2200/20* (2013.01)

(58) Field of Classification Search
CPC ........ A41D 27/08; A41D 27/085; A41D 1/04; A41D 2200/20; B33Y 80/00; Y10T 24/3918; Y10T 24/3933; F16G 11/103
See application file for complete search history.

(56) References Cited

U.S. PATENT DOCUMENTS

| 4,361,938 | A | * | 12/1982 | Emery | F16G 11/103 114/218 |
|---|---|---|---|---|---|
| 7,614,179 | B2 | * | 11/2009 | Kavanaugh | A01K 91/03 24/130 |
| D629,286 | S | | 12/2010 | Laskowski | |
| 8,925,116 | B2 | | 1/2015 | Augustine et al. | |
| 2005/0156425 | A1 | * | 7/2005 | Pearson | B42D 1/007 281/21.1 |
| 2012/0291229 | A1 | * | 11/2012 | Spencer | A45F 3/14 24/115 R |
| 2015/0089975 | A1 | | 4/2015 | Paleschuck et al. | |

* cited by examiner

*Primary Examiner* — Robert Sandy
*Assistant Examiner* — Louis A Mercado
(74) *Attorney, Agent, or Firm* — Tracy Jong Law Firm; Tracy P. Jong; Cheng Ning Jong

(57) ABSTRACT

A unitary drawstring accessory configured to be secured to a drawstring, the accessory including a body; and a channel including a first end, a second end, a length from the first end and the second end, at least one inflection point disposed along the length of the channel, wherein the channel is disposed on a portion of the body, wherein the channel is configured to require manipulation of the drawstring such that a portion of the drawstring may be seated in the channel and upon removal of such manipulation, the portion of the drawstring is frictionally secured in the channel.

11 Claims, 9 Drawing Sheets

UNITARY DRAWSTRING ACCESSORY

BACKGROUND OF THE INVENTION

1. The Field of the Invention

The present invention relates to a drawstring accessory. More specifically, the present invention is directed to unitary drawstring accessory.

2. Background Art

Various objects have been attempted for their removable attachments or coupling to a drawstring, lace, and cord, etc. Most of these objects come in the form of assemblies which require multiple contributing basic components. Prior unitary accessories lack critical features which make the accessories simple to use while making their attachments to drawstrings secure.

U.S. Pat. No. 8,925,116 to Augustine et al. (Hereinafter Augustine) discloses a decorative and/or promotional accessory to be secured to a lace such as a shoe lace includes a molded plastic body having a passage longitudinally extending therethrough from a first opening to a second opening. The passage is sized and shaped to receive the lace therethrough and to frictionally secure the body in a desired position along the lace. The accessory also includes indicia provided on an exterior surface of the accessory which can be in the form of any desired message, name, number, logo, graphic, or the like. An alternative embodiment of the accessory is also disclosed which is to be secured to a cap bill. This embodiment includes a slot radially extending to the passage which is sized and shaped to receive the cap brim therein and to resiliently grip the bill and removably secure the accessory in a desired position along the bill. Augustine's passage is a straight passage and therefore lacks a passage with at least one inflection point and the details of the passage as proposed elsewhere herein that enhance the ability of the accessory to be securely attached to a drawstring.

U.S. Design Pat. No. D629286 to Laskowski (Hereinafter Laskowski) discloses a cord retainer that is partially spherical with a channel that is enlarged on one end. Laskowski lacks a channel with at least one inflection point and the details of the channel as proposed elsewhere herein that enhance the ability of the accessory to be securely attached to a drawstring.

U.S. Pat. Pub. No. 20150089975 of Paleschuck et al. (Hereinafter Paleschuck) discloses indicia-bearing objects for mounting, identifying and displaying on cords, strings, cables, laces, etc. The objects may be ornamental and/or used for identifying objects configured for mounting and displaying on electrical and/or electronics cords, including cords for consumer electronics such as ear-bud cords and phone cords, as well as on lanyards, draw strings, pull strings, shoe laces, necklaces, bracelets, and the like. The objects may additionally incorporate visual features in the form of an LED light, and/or audio features via a prerecorded audio message, sound and musical composition. Paleschuck's objects shown in FIG. 14 of Paleschuck are not unitary as they are assembled from multiple components and each object relies on a two-piece design that restrains a string to which the object is attached. Objects that are formed from multiple parts suffer from various disadvantages. First, various parts must be made to so that the end product can work. Then, if one of the complementary parts is lost, the other will not work. Further, in one embodiment, Paleschuck's passage is also a straight passage and therefore lacks a passage with at least one inflection point and the details of the passage as proposed elsewhere herein that enhance the ability of the accessory to be securely attached to a drawstring. A pull of Paleschuck's object along the length of a cord to which the object is attached may readily dislodge the object from the cord.

Thus, there arises a need for a unitary drawstring accessory that can be removably and securely attached to a drawstring. Augustine, Laskowski and Paleschuck all disclose various objects that fail to meet the objectives of the present accessory.

SUMMARY OF THE INVENTION

In accordance with the present invention, there is provided a unitary drawstring accessory configured to be secured to a drawstring, the accessory including:
 (a) a body; and
 (b) a channel including, a first end, a second end, a length from the first end to the second end, at least one inflection point disposed along the length of the channel, wherein the channel is disposed on a portion of the body,
wherein the channel is configured to require manipulation of the drawstring such that a portion of the drawstring may be seated in the channel and upon removal of such manipulation, the portion of the drawstring is frictionally secured in the channel.

In one embodiment, the channel further includes a mouth, a core having a width and a neck having a width, the neck disposed between the core and the mouth, wherein the width of the neck is smaller than the width of the core. In one embodiment, there are two inflection points such that the portion of the drawstring inserted in the channel has two ends that are substantially directed in the same direction. In one embodiment, the body includes a mark that is an indicia, a shape, a message, a name, a number, a logo or a graphic. In one embodiment, the first end and the second end are substantially parallel such that a top end of the portion of the drawstring is substantially parallel to a bottom end of the portion of the drawstring. In one embodiment, the accessory is configured to be constructed by three-dimensional (3D) printing. In one embodiment, the accessory is configured to be constructed in more than one color. In one embodiment, the accessory is configured to be constructed in more than one material. In one embodiment, the accessory is configured to be constructed in more than one hardness. In one embodiment, the channel includes a surface texture configured for facilitating frictional attachment of the portion of the drawstring within the channel. In one embodiment, the accessory includes an identification device configured for allowing the accessory to be identified. In one embodiment, the accessory includes an electronic device. In one embodiment, the accessory includes a base configured to allow the accessory to be disposed upright.

An object of the present invention is to provide a drawstring accessory that is unitary and capable of being securely and removably attached to a drawstring and one that can be formed without additional parts which can complicate manufacturing and usage.

Another object of the present invention is to provide a drawstring accessory that lends itself to be fabricated with three-dimensional (3D) printing manufacturing techniques.

Another object of the present invention is to provide a drawstring accessory that can be fabricated in multiple colors without involving conventional painting methods.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

2—centerline of channel
4—drawstring
6—article of clothing or hoodie sweatshirt
8—drawstring accessory
10—body
12—channel
14—core
16—mouth of channel
18—inflection point
20—angle change of drawstring centerline at inflection point
22—neck of channel
24—knot
26—flare angle
28—surface ornamentation
30—width of neck
32—width of mouth
34—width or diameter of core
36—surface element
38—base
40—top layer
42—direction in which drawstring is pulled to cinch hoodie
44—first end of channel
46—second end of channel
48—electronic tag
50—electronic device
52—interface of electronic device with outside devices

PARTICULAR ADVANTAGES OF THE INVENTION

Each of a present drawstring accessory includes a channel including at least one inflection point that aids in securing the accessory to a drawstring securely. Each of a present drawstring accessory does not require any moving parts, simplifying the design and mechanism used for attaching the accessory to a drawstring.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
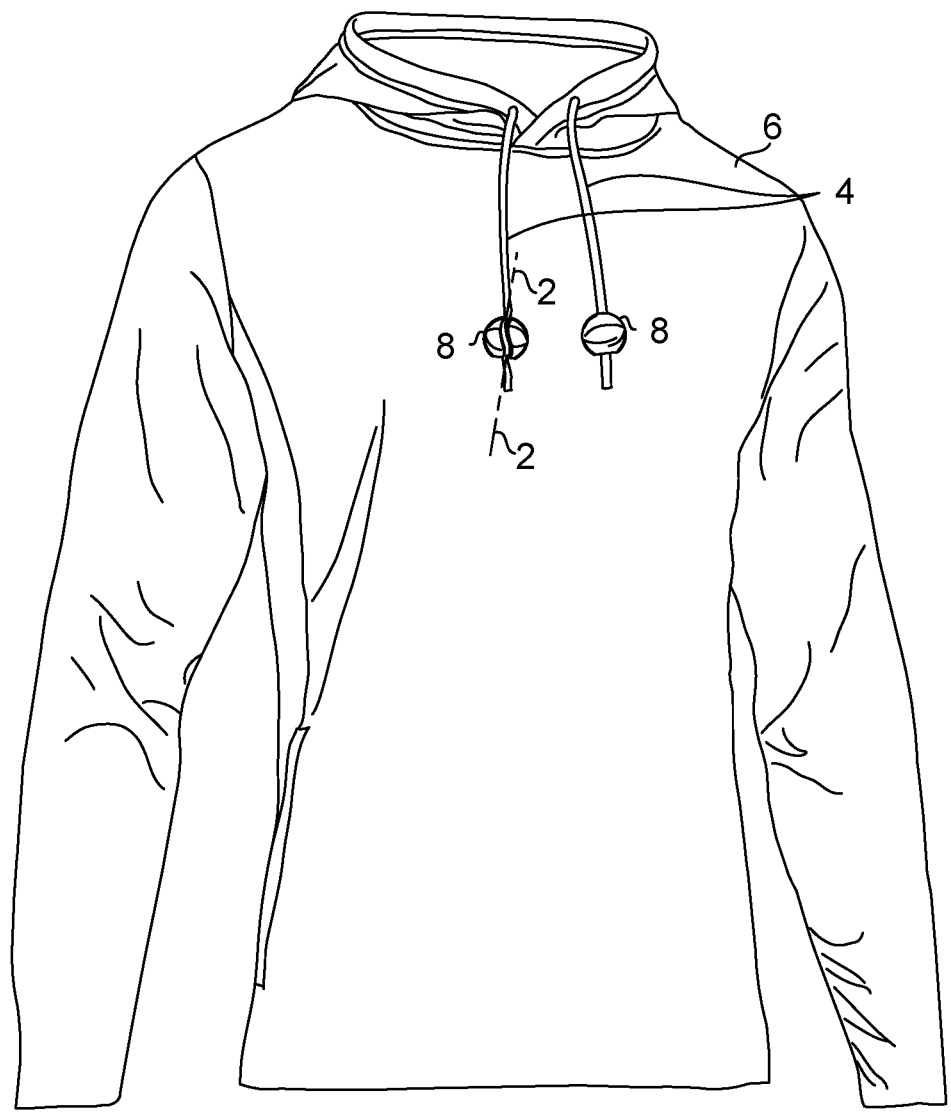
FIG. 1 is a front view of an article of clothing having drawstrings upon which a plurality of one embodiment of the present accessories are used.

FIG. 1 is a front view of an article of clothing 6, e.g., a hoodie sweatshirt, having drawstring 4 ends upon which a plurality of one embodiment of the present accessories are used. The drawstring 4 is shown to be unknotted at its two ends. The accessory 8 on the left side of the reader is shown with the channel facing the reader, although, in use, the accessory is preferably installed such that the channel is obscured as shown in the accessory 8 disposed on the right side to the reader. Note that the centerlines 2 of the first and second ends of the channel facing the reader are preferably parallel such that the portions of the drawstring engaged to the first and second ends of the channel appear parallel for aesthetics purposes. Such accessories 8 may be used for several functions. First, the accessories may be used as hand grasps for the drawstrings 4 and objects that prevent accidental disengagement of the drawstring from its tube. Then, the accessories 8 may be used to showcase the themes of a particular event or the personality of their wearer, or otherwise show off a collection of designs that make an article of clothing that is otherwise monotonous and boring, interesting. Further, as disclosed elsewhere herein, the accessories 8 may also be used to hold certain identifying and electronic devices, e.g., memory sticks, speakers (wired or wireless), charging block, batteries and other compact devices, etc. In one example, the accessories 8 may be marketed as fashionable, collectible or customized or customizable items. For short production runs, the accessories 8 are preferably printed according to three-dimensional (3D) printing techniques to eliminate the need for hard tooling and to make customized accessories cost effective to produce.

Figure 2:
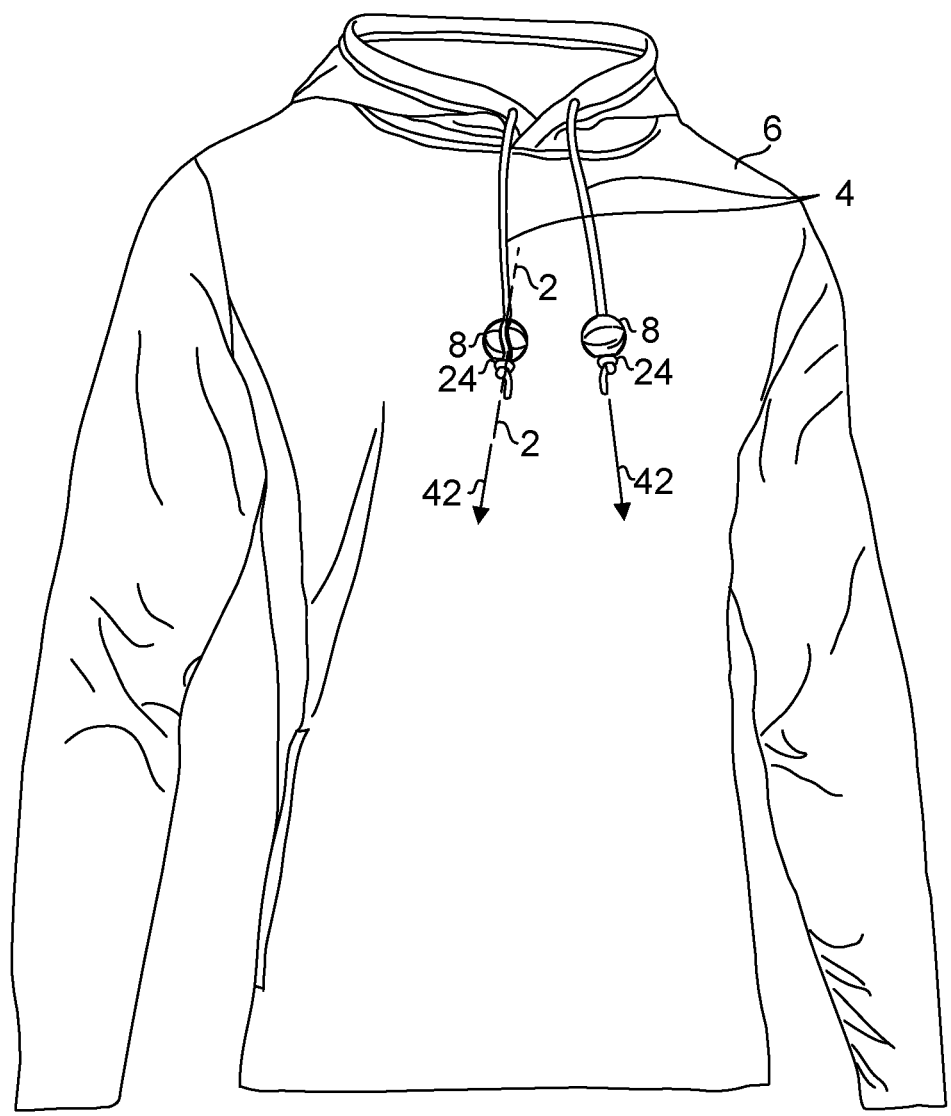
FIG. 2 is a front view of an article of clothing having drawstrings upon which a plurality of one embodiment of the present accessories are used.

FIG. 2 is a front view of an article of clothing having drawstrings upon which a plurality of one embodiment of the present accessories are used. Note that, in FIG. 2, the drawstring is knotted at both of its ends. A drawstring that is knotted at both ends prevents accidental dislodgment of the drawstring from the tube through which it is disposed as each knot 24 further serves as a stop to prevent movement of an accessory 8 along a length of the drawstring especially when pulled in direction 42, although without it, the accessory 8 should still be coupled securely with the drawstring. In both FIGS. 1 and 2, the accessories 8 are shown to be used with a hoodie sweatshirt where the drawstring is used to cinch the hoodie around one's head. Most modern and stylish hoodies are coupled with drawstrings that are substantial, attractive and designed to draw one's attention to the drawstrings.

Figure 3:
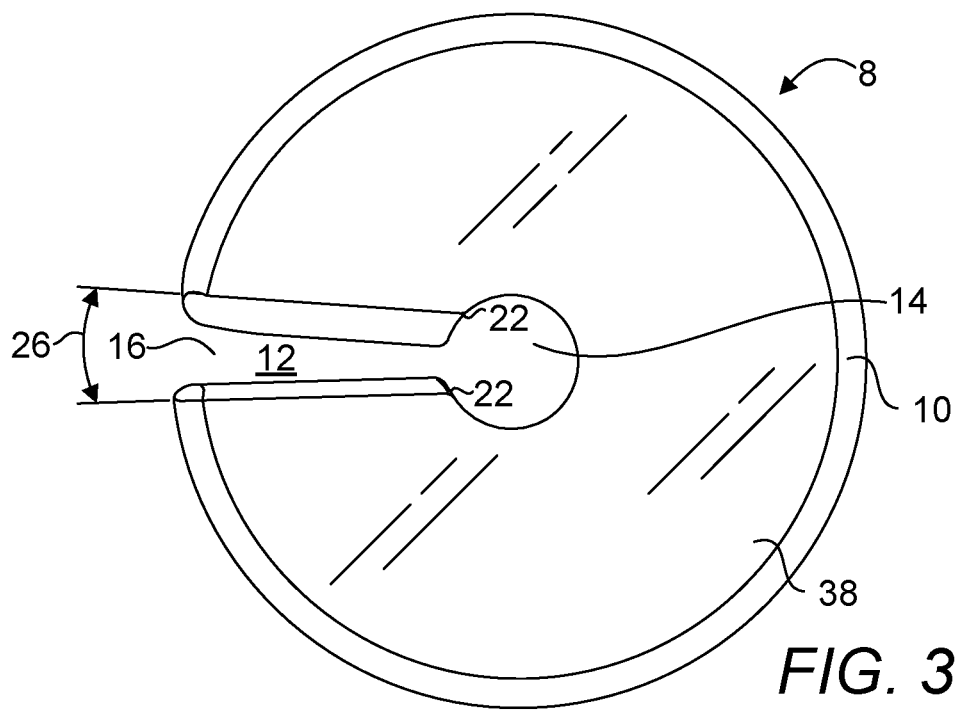
FIG. 3 is a bottom perspective view of one embodiment of the present accessory.
Figure 4:
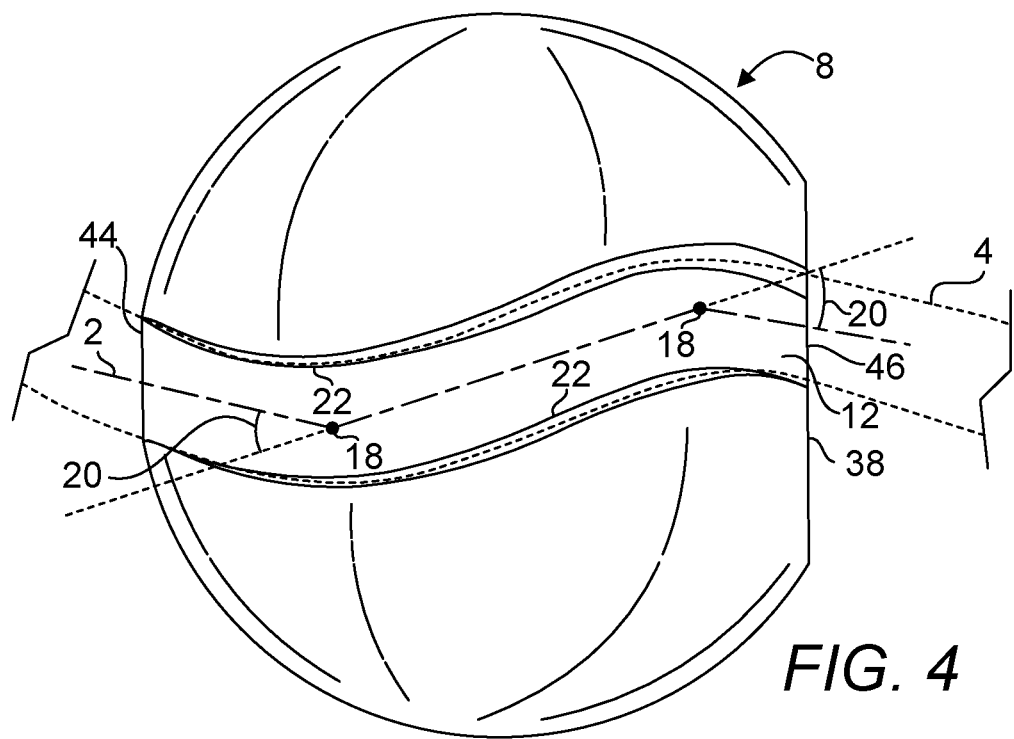
FIG. 4 is a rear perspective view of one embodiment of the present accessory.

FIG. 3 is a bottom perspective view of one embodiment of the present accessory 8. FIG. 4 is a rear perspective view of one embodiment of the present accessory 8. The unitary drawstring accessory 8 is essentially circular in shape with a truncated bottom portion forming a base 38 that facilitates the accessory 8 to stand upright while set atop a surface and not in use. The accessory 8 includes a body 10 and a channel 12. The channel 12 includes a length and two inflection points 18 disposed along the length of the channel 12, wherein the channel 12 is disposed on a portion of the body 10. In seating a portion of a drawstring in the channel 12, the drawstring is first manipulated to form a shape that mimics the shape of the channel 12 before being pushed towards the core 14 of the accessory 8. Referring to FIG. 4, the channel 12 is shaped in the form of letter "S." If the channel 12 is represented by a centerline 2, note that the channel 12 changes direction twice, each time at an inflection point 18. An inflection point in a channel presents itself as an obstacle in preventing the portion of a drawstring disposed the channel from being straightened or reduced in diameter or "thinned out" as the drawstring is stretched. Angle 20 ranges from about 5 degrees to about 45 degrees. It shall also be noted that the channel 12 possesses a centerline 2 having portions that are substantially parallel at both ends of the channel 12. Upon removal of such manipulation, the portion of the drawstring is frictionally secured in the channel 12 and substantially within the core 14, the seated portion of the drawstring is terminated at a first end 44 and a second end 46 of the channel 12. Referring back to FIGS. 1 and 2, the first end is essentially the top portion of the channel 12 while the second end is essentially the bottom portion of the channel 12 and the first end 44 and the second end 46 are substantially parallel to one another.

Figure 5:
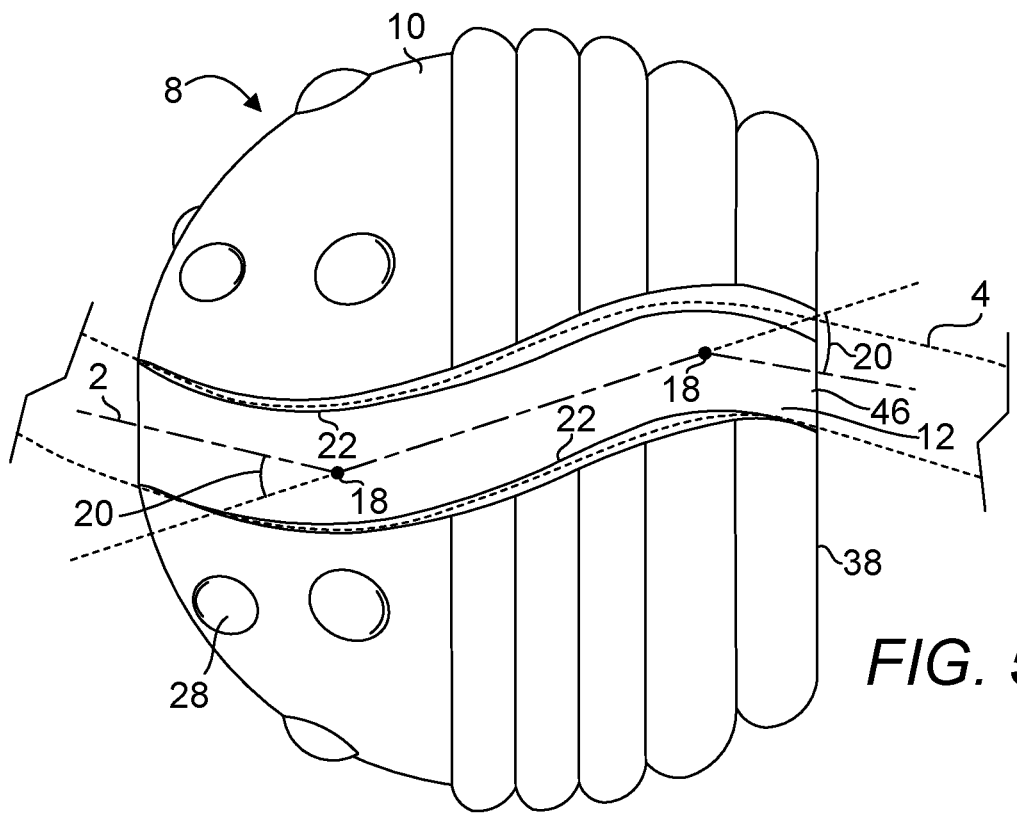
FIG. 5 is a rear perspective view of another embodiment of the present accessory.
Figure 6:
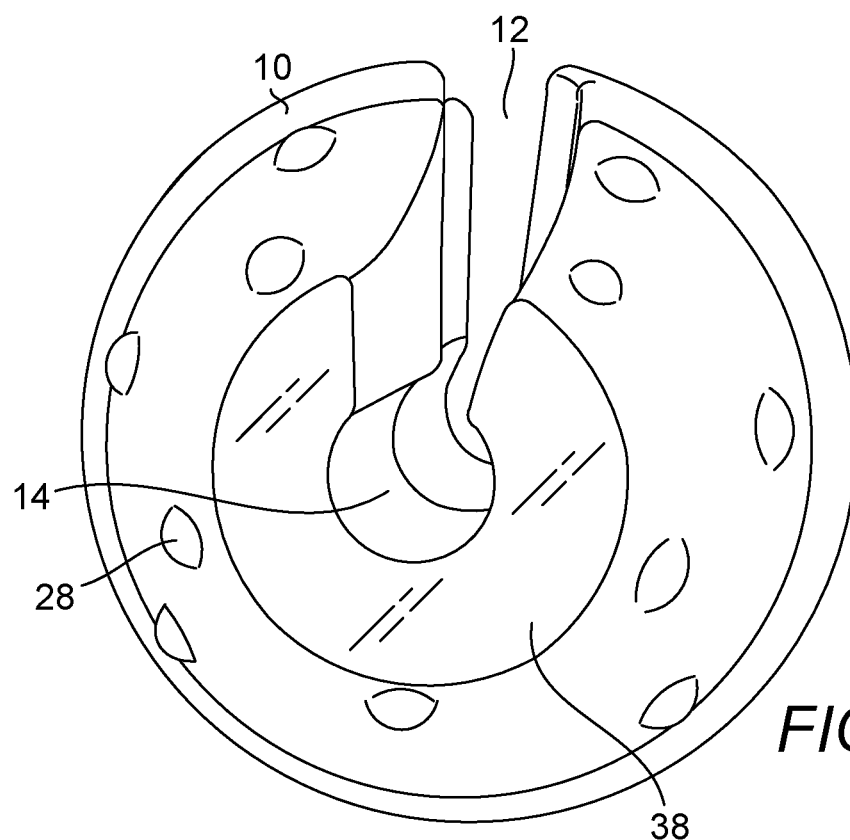
FIG. 6 is a bottom perspective view of yet another embodiment of the present accessory.

FIG. 5 is a rear perspective view of another embodiment of the present accessory 8. FIG. 6 is a bottom perspective view of yet another embodiment of the present accessory 8. The embodiment shown in FIGS. 5 and 6 is similar to the embodiment shown in FIGS. 1-4 with the exception of the differences in surface ornamentations 28. The surface ornamentations can include, but not limited to, a mark that is an indicia, a shape, a message, a name, a number, a logo or a graphic and the like. In this example, the accessory is formed in the shape of a hamburger with the left portion of the hamburger appearing as a bun with raised features representing sesame seeds. Other objects that may be represented by the generally spherical shape of the accessories shown in FIGS. 1-6, include, but not limited to, balls, e.g., various sports, e.g., soccer ball, volleyball, tennis ball and basketball, etc.

In one embodiment, the unitary drawstring accessory is configured to be constructed by three-dimensional (3D) printing. As a present accessory involves at least one inflection point, traditional manufacturing techniques require that a mold be used to cast the basic shape with or without surface ornamentations before a channel is milled, e.g., from the first end to the second end using, e.g., a router, all of which require significant investments in tooling and labor. Further, if polymeric materials are used in fabrication of the present accessories, their low melting point may present a great challenge to milling as heat generated during the milling process may readily deform the blank being milled.

Figure 7:
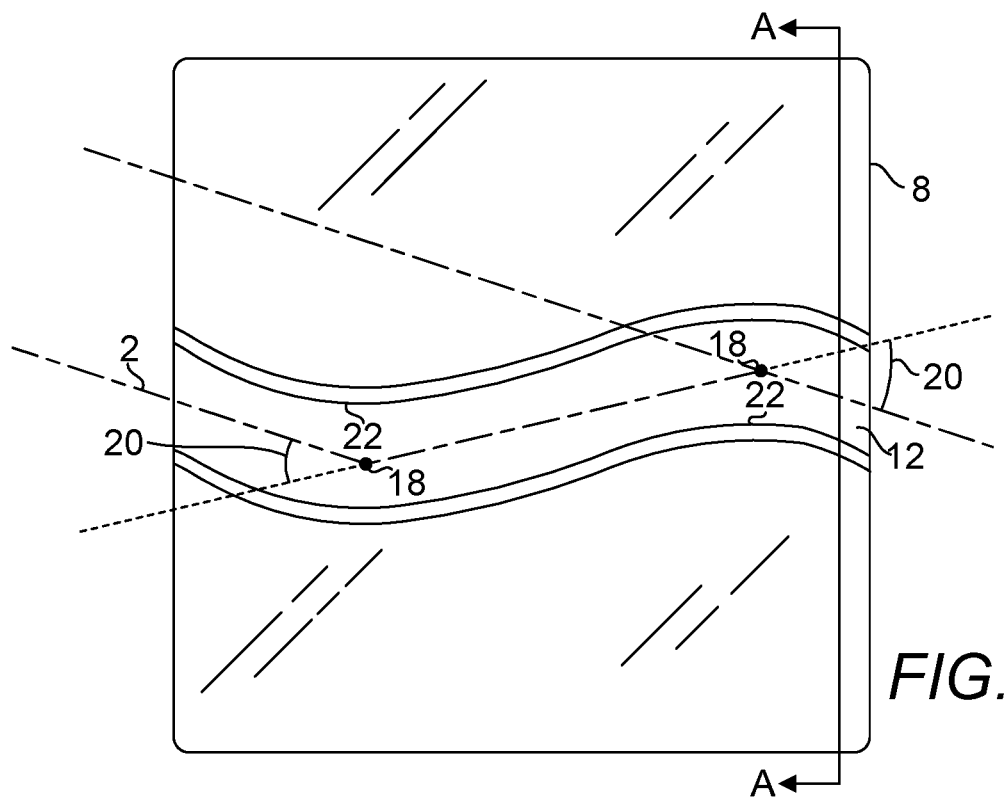
FIG. 7 is a rear view of yet another embodiment of the present accessory.
Figure 8:
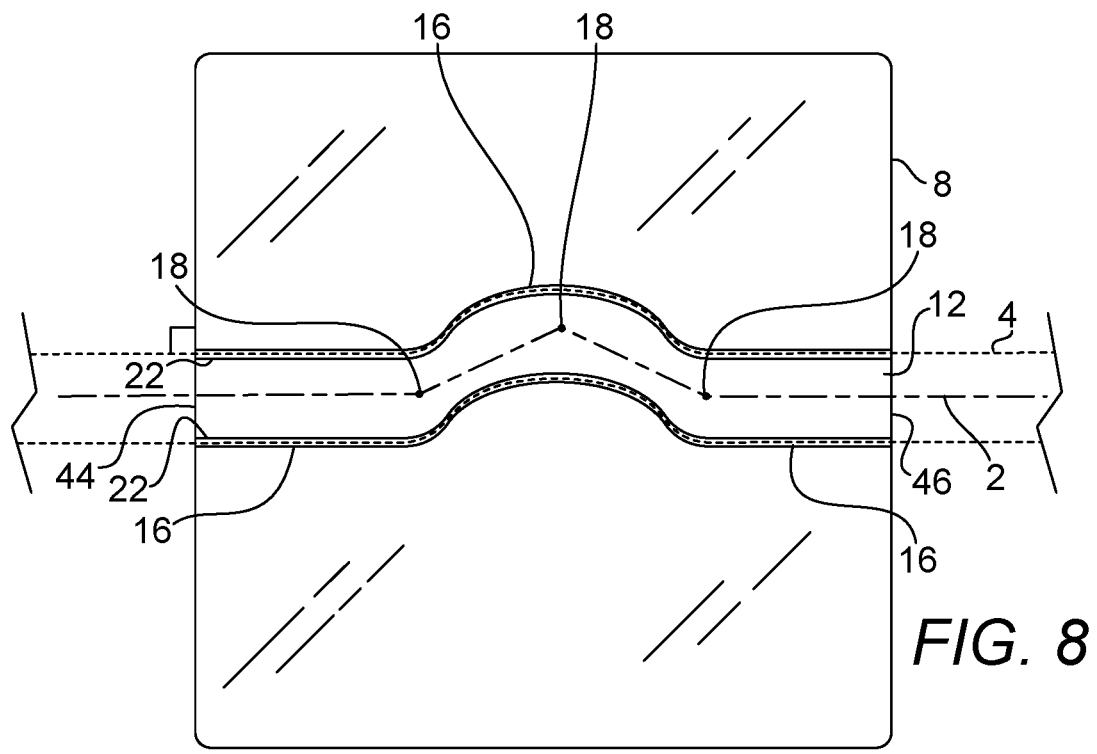
FIG. 8 is a rear view of yet another embodiment of the present accessory.

FIG. 7 is a rear view of yet another embodiment of the present accessory. Here, a rectangular body 10, e.g., a cube, is used instead of a generally spherical body 10. Only one face is shown with a channel 12 that is similar in shape, i.e., S-shaped, to those shown earlier. FIG. 8 is a rear view of yet another embodiment of the present accessory. Again, the channel 12 of the accessory 8 is characterized by two inflection points 18. However, in this embodiment, the first and second ends 44, 46 of the channel 12 are disposed at substantially right angle to the body 10 leaving the three inflection points 18 between these two ends 44, 46 and removing any consideration necessary to get an accessory to "square up" with a drawstring. With three inflection points 18, the drawstring can be secured more securely in the accessory. However, this benefit may be offset by the need for a user to more meticulously, therefore taking longer and/or higher level of skill to form the portion of the drawstring to be seated in the channel in the shape of the channel.

Figure 9:
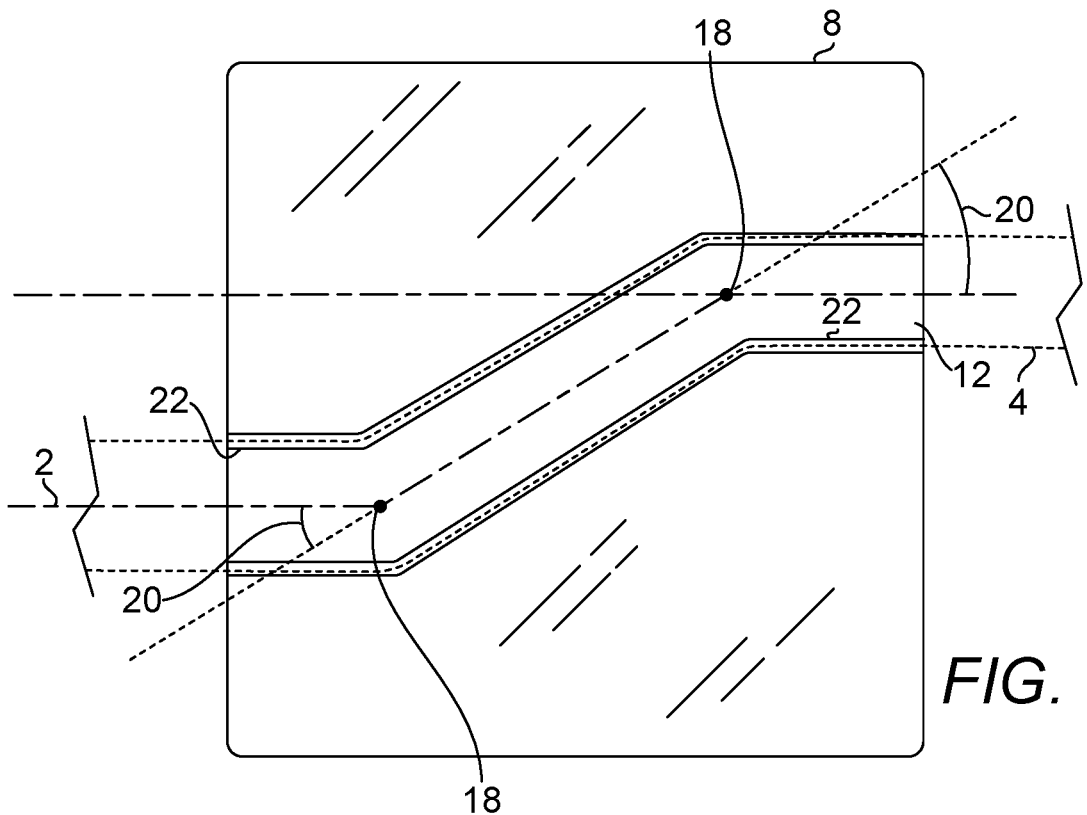
FIG. 9 is a rear view of yet another embodiment of the present accessory.
Figure 10:
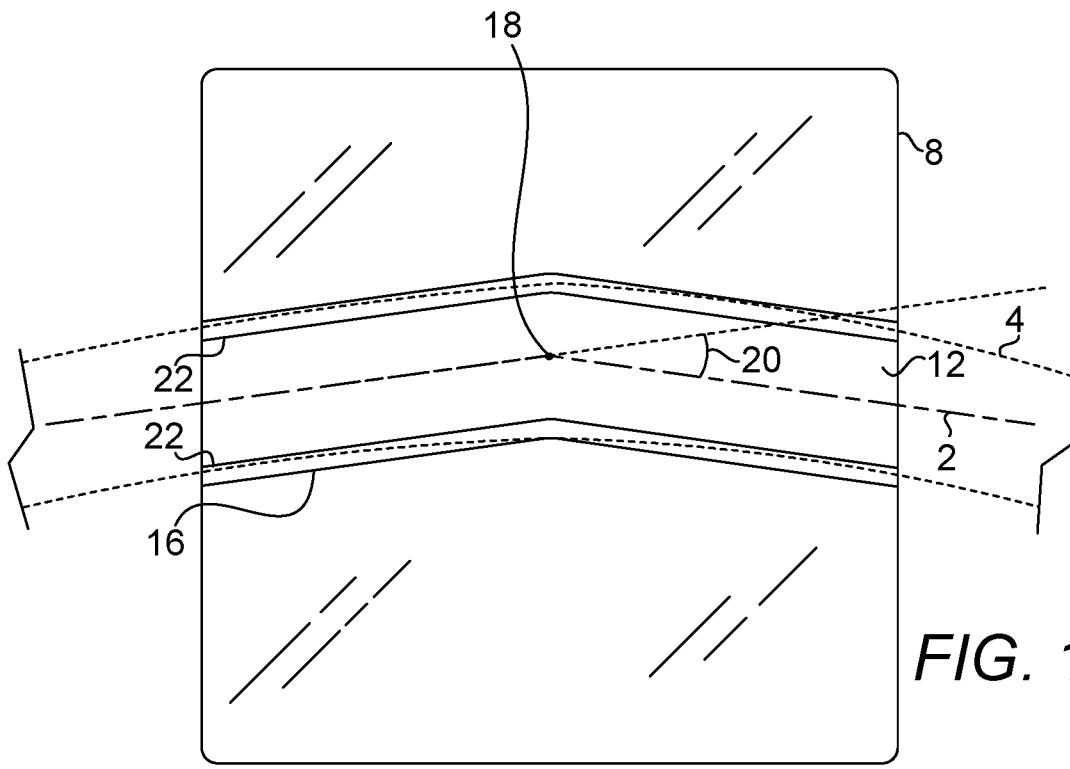
FIG. 10 is a rear view of yet another embodiment of the present accessory.

FIG. 9 is a rear view of yet another embodiment of the present accessory. In this embodiment, two inflection points 18 are used to result in a first and second ends of the channel 12 that are parallel albeit offset from one another. FIG. 10 is a rear view of yet another embodiment of the present accessory. Here, only one inflection point 18 is used, making it uncomplicated to form the portion of the drawstring in a shape to be secured within the channel 12 while still retaining the benefit of using a channel having at least one inflection point 18, i.e., to prevent or reduce any potential movement of a seated drawstring along the length of the channel 12.

Figure 11:
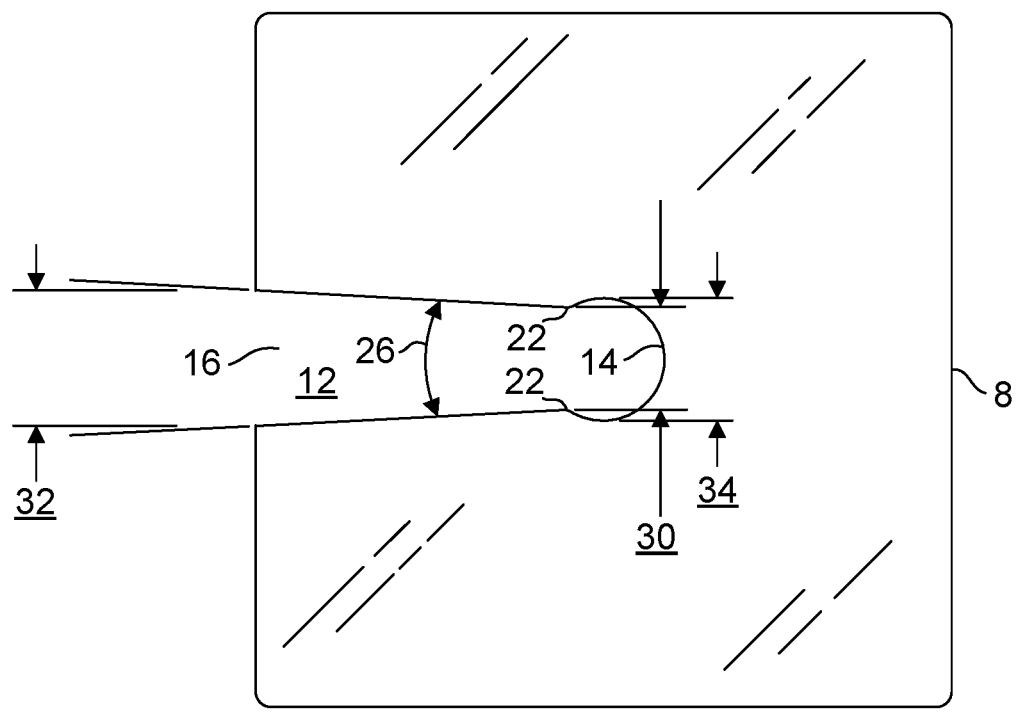
FIG. 11 is a bottom view of a cross-sectional slice of the embodiment of the present accessory shown in FIG. 7, depicting one embodiment of the cross-sectional shape of the channel of the present accessory.
Figure 12:
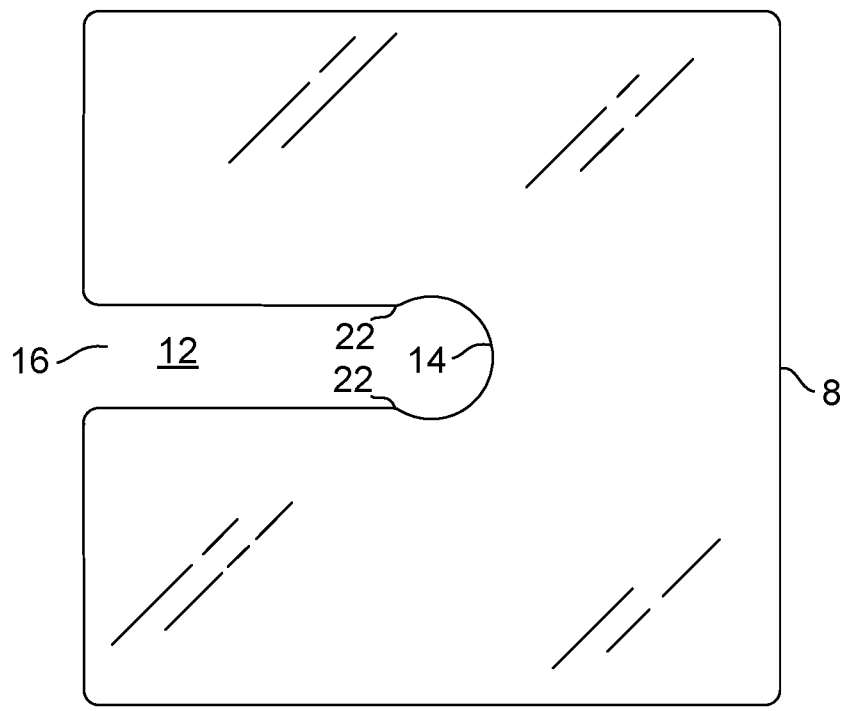
FIG. 12 is a bottom view of a cross-sectional slice of one embodiment of the present accessory, depicting another embodiment of the cross-sectional shape of the channel of the present accessory.

For the sake of clarity, in the ensuing figures, the cross-sectional profile of a channel is shown as a thin slice taken from an accessory. FIG. 11 is a bottom view of a cross-sectional slice of the embodiment of the present accessory shown in FIG. 7, as if the slice is a result of making a cut along line AA of FIG. 7, depicting one embodiment of the cross-sectional shape of the channel of the present accessory. The channel 12 and other structural details connected to it essentially represent the cross-sectional details along the length of the channel albeit offset laterally to form a channel having at least one inflection point. With a channel 12 including a core 14, the core 14 runs the entire length of the channel 12. The channel 12 includes a mouth 16 having a width and a neck 22 having a width. The neck 22 is disposed between the core 14 and the mouth, wherein the width 30 of the neck 22 is smaller than the width 34 of the core 14. In one embodiment, the width 34 of the core 14 measures about ⁵⁄₃₂ inch. The width 32 of the mouth that is larger mouth in comparison with the width of other parts of the channel facilitates insertion of the portion of a drawstring to be seated in the channel 12 while the neck 22 aids in retaining a seated portion of the drawstring. Essentially, the channel 12 flares at an angle 26 of from about 0 degrees to about 10 degrees in the direction from the core 14 to a surface of the body 10. In one embodiment, at 0 degrees, the walls of the channel 12 are said to be parallel to one another as shown in FIG. 12. In one embodiment, a ratio of the neck width 30 to the core width 34 is about 0.6. Without a flare, the chance of an accidental dislodgment is further reduced.

Figure 13:
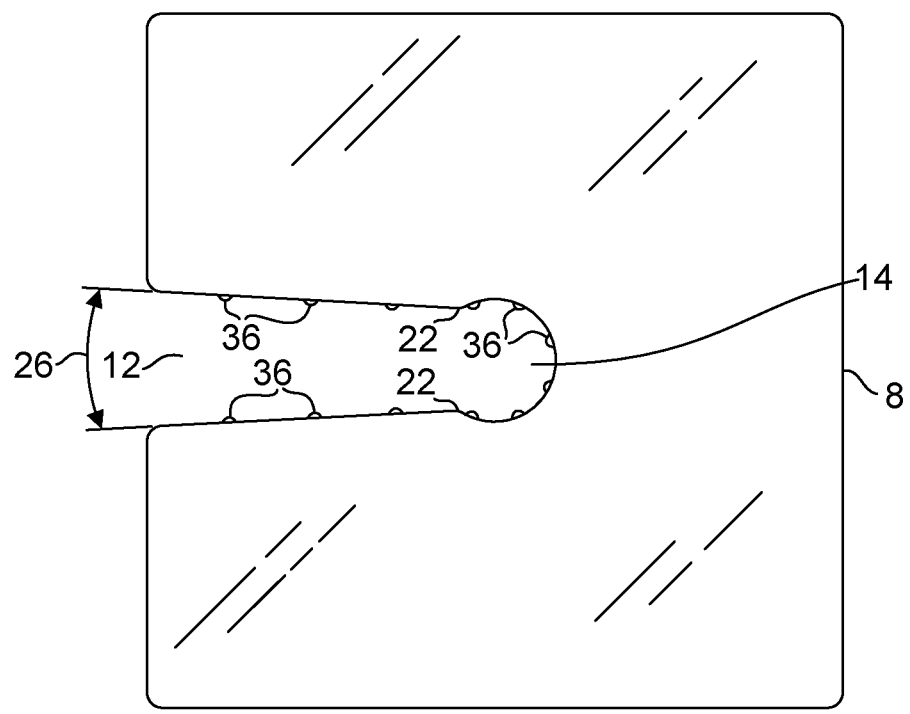
FIG. 13 is a bottom view of a cross-sectional slice of one embodiment of the present accessory, depicting another embodiment of the cross-sectional shape of the channel of the present accessory.

FIG. 13 is a bottom view of a cross-sectional slice of one embodiment of the present accessory, depicting another embodiment of the cross-sectional shape of the channel of the present accessory. In this embodiment, the surfaces coming into contact with a drawstring is further roughened by using surface elements 36, e.g., bumps, spikes and other raised features, etc.

Figure 14:
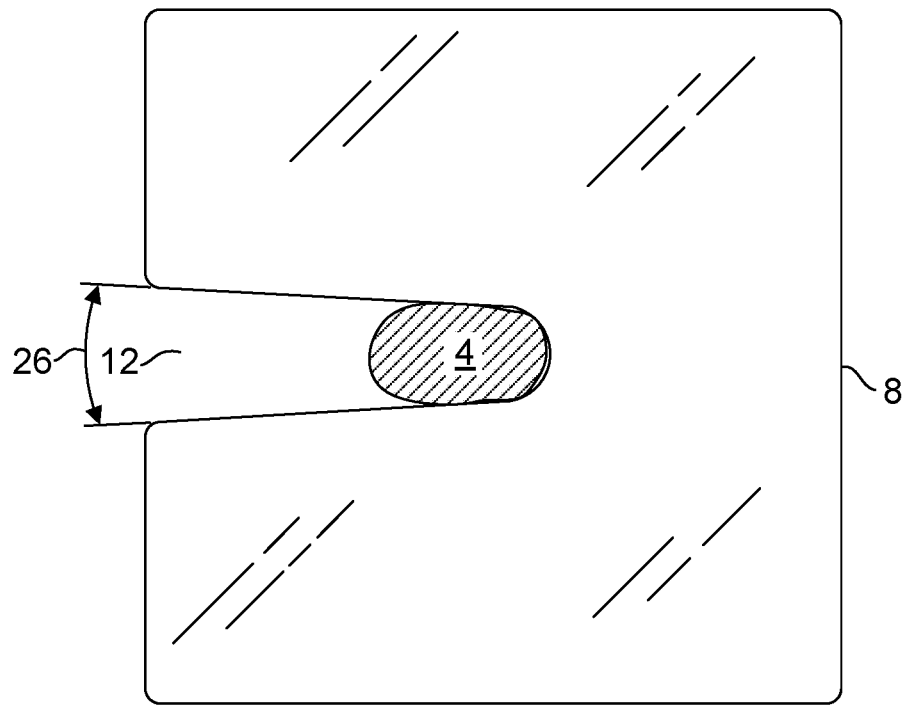
FIG. 14 is a bottom view of a cross-sectional slice of one embodiment of the present accessory, depicting yet another embodiment of the cross-sectional shape of the channel of the present accessory.

FIG. 14 is a bottom view of a cross-sectional slice of one embodiment of the present accessory, depicting yet another embodiment of the cross-sectional shape of the channel of the present accessory. In this embodiment, the channel 12 is not terminated at one end with a core as shown in FIGS. 6 and 11-13. Without a core 14, a portion of a drawstring may be seated and secured in a channel 12 although not as well in most cases as the accessory 8 lacks a neck 22 which aids in retaining a relaxed drawstring.

Figure 15:
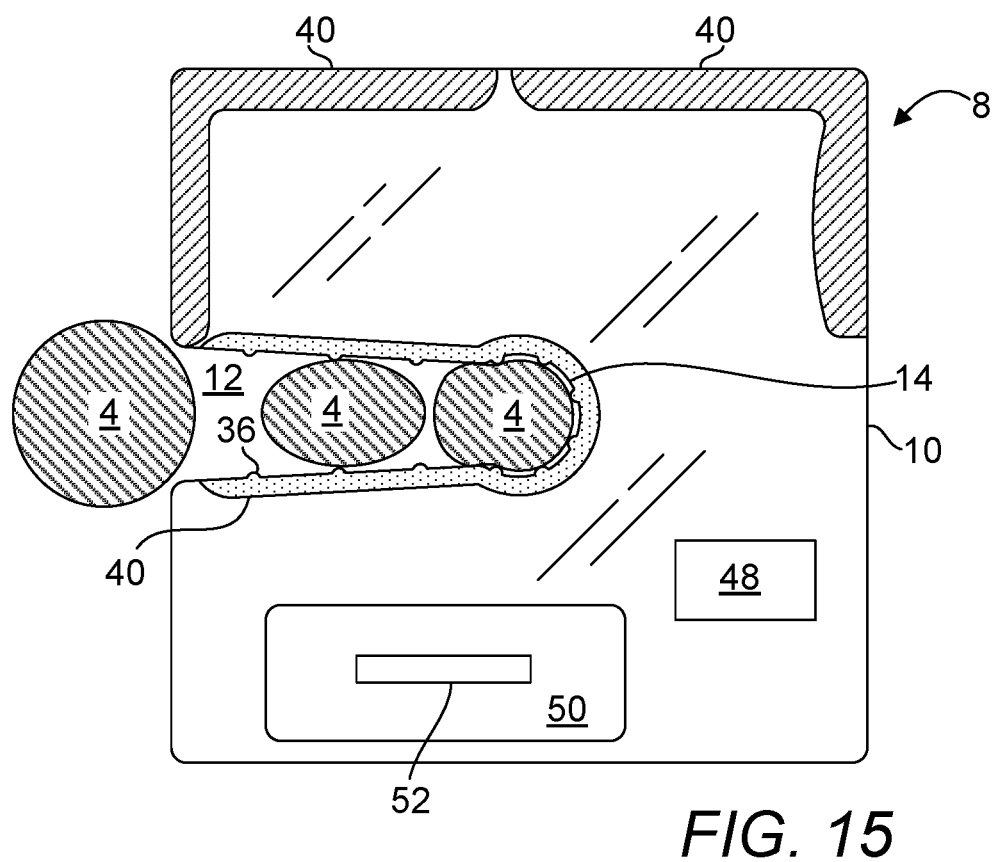
FIG. 15 is a bottom view of a cross-sectional slice of the embodiment of the present accessory, depicting a manner in which a drawstring is secured in a channel of the accessory and examples of selective surface textures and colors and devices for either one or both functional and ornamental purposes.

FIG. 15 is a bottom view of a cross-sectional slice of the embodiment of the present accessory, depicting a manner in which a drawstring is secured in a channel of the accessory and examples of selective surface textures and colors and devices for either one or both functional and ornamental purposes. Although various features are shown in one figure, any one of or combinations of the features shown may be used in an embodiment of a present accessory. In one embodiment, the accessory is configured to be constructed in more than one color using 3D printing. Essentially, substrates of different colors are used to form the skin or top layer 40 of the body 10. In one embodiment, the accessory is configured to be constructed in portions with different materials. For instance, the channel 12 may be constructed with a softer polymeric material with raised elements or a suitable surface texture or roughness to result in a material 40 with a resilient quality that enhance the attachment of the accessory 8 to a drawstring. The inner portion of the body 10 may be constructed from a material sufficiently rigid to form a solid backbone that resists deformation. Softer materials may be used as the top layer 40 to provide a look-and-feel or feel that is suitable for a particular user. In other words, the accessory 8 may be constructed from materials of different hardness and/or surface texture. Also shown herein is the incorporation of an electronic tag 48, e.g., a Near Field Communication (NFC) tag, to aid in the identification of the accessory 8. In another embodiment, an electronic device 50, e.g., an audio speaker, memory stick, power storage, e.g., battery, battery charger, visual display device, e.g., Light Emitting Diode (LED), etc., all of which are capable of wire or wireless communication with a device outside of the accessory 8 via an interface 52, is incorporated in the accessory 8 for the convenience of the user. In use, the electronic tag 48 can be used to authenticate the accessory 8. This is especially useful when the accessory 8 is also used as a collectible. Referring back to FIG. 15, three sketches of the cross-sectional profile of a drawstring 4 are used to represent the manner in which the drawstring 4 is removably attached to an accessory 8. Note that the sketch to on the left shows a drawstring which has not been pulled taut, therefore appearing with a cross-sectional area that is larger than the other two to its right. Upon being forced into the channel 12, its profile changes to suit the shape of the channel 12. As a tension continues to be applied to the drawstring 4 and the drawstring 4 continues to be pushed towards the core 14, the cross-sectional area of the drawstring 4 decreases slightly, especially along the lengths of the drawstring not encompassed by one or more inflection points, facilitating the seating of the drawstring in the channel 12 and/or core 14. Upon release of the tension, the cross-sectional area of the drawstring expands to cause the drawstring to further engage the channel 12 and/or core 14.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:
1. A unitary drawstring accessory configured to be secured to a drawstring, said accessory comprising:
   (a) a body; and
   (b) a channel comprising a first end, a second end, a length from said first end to said second end, at least one inflection point disposed along the length of said channel, a mouth having a depth, said mouth disposed along the length of said channel, said mouth having a width, a core having a depth, said core disposed along the length of said channel, said core having a width, and a neck along the length of said channel, said neck having a width, wherein said channel is disposed on a portion of said body, said channel extending from a surface of said body into said body and said channel defines a non-linear path between said first end and said second end for the drawstring, said neck is disposed between said core and said mouth, said width of said neck is smaller than said width of said core and said width of said mouth, said width of said neck and said width of said core remain substantially constant throughout the length of said channel, said depth of said mouth is defined by a distance from said surface of said body from which said channel extends into said body to said neck, said depth of said core is defined by a distance from said neck to a bottom surface of said channel and said depth of said mouth is greater than said depth of said core along at least one cross-section along the length of said channel, wherein said channel is configured to require manipulation of the drawstring such that a portion of the drawstring may be seated in said channel and upon removal of such manipulation, the portion of the drawstring is frictionally secured in said channel.

2. The unitary drawstring accessory of claim 1, wherein said at least one inflection point are two such that the first end and the second end of the channel can be directed substantially in a same direction.

3. The unitary drawstring accessory of claim 1, wherein said first end and said second end are substantially parallel such that a top end of the portion of the drawstring is substantially parallel to a bottom end of the portion of the drawstring.

4. The unitary drawstring accessory of claim 1, wherein said unitary drawstring accessory is configured to be constructed by three-dimensional (3D) printing.

5. The unitary drawstring accessory of claim 4, wherein said unitary drawstring accessory is configured to be constructed in more than one color.

6. The unitary drawstring accessory of claim 4, wherein said unitary drawstring accessory is configured to be constructed in more than one material.

7. The unitary drawstring accessory of claim 4, wherein said unitary drawstring accessory is configured to be constructed in more than one hardness.

8. The unitary drawstring accessory of claim 1, wherein said channel comprises a surface texture configured for facilitating frictional attachment of the portion of the drawstring within the channel.

9. The unitary drawstring accessory of claim 1, further comprising an electronic tag configured for allowing said unitary drawstring accessory to be identified.

10. The unitary drawstring accessory of claim 1, further comprising an electronic device.

11. The unitary drawstring accessory of claim 1, further comprising a base configured to allow said unitary drawstring accessory to be disposed upright.

* * * * *